(12) United States Patent
Kuboi et al.

(10) Patent No.: US 12,530,008 B2
(45) Date of Patent: Jan. 20, 2026

(54) MOTOR CONTROL METHOD, MOTOR CONTROL DEVICE, AND MOTOR CONTROL SYSTEM

(71) Applicant: Panasonic Intellectual Property Management Co., Ltd., Osaka (JP)

(72) Inventors: Yusuke Kuboi, Osaka (JP); Hiroshi Fujiwara, Osaka (JP); Kenta Murakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 191 days.

(21) Appl. No.: 18/560,384

(22) PCT Filed: Apr. 14, 2022

(86) PCT No.: PCT/JP2022/017853
§ 371 (c)(1),
(2) Date: Nov. 11, 2023

(87) PCT Pub. No.: WO2022/244564
PCT Pub. Date: Nov. 24, 2022

(65) Prior Publication Data
US 2024/0272602 A1    Aug. 15, 2024

(30) Foreign Application Priority Data
May 21, 2021    (JP) ................. 2021-086300

(51) Int. Cl.
G05B 19/29    (2006.01)
G05B 19/19    (2006.01)
H02P 6/16    (2016.01)

(52) U.S. Cl.
CPC ............. *G05B 19/19* (2013.01); *H02P 6/16* (2013.01); *G05B 2219/41122* (2013.01)

(58) Field of Classification Search
CPC ............. G05B 19/19; G05B 19/4155; G05B 19/22119; G05B 19/39195; G05B 19/37435
See application file for complete search history.

(56) References Cited

U.S. PATENT DOCUMENTS

2023/0069227 A1*    3/2023    Osada ................... B23Q 15/12

FOREIGN PATENT DOCUMENTS

JP    05-297954    11/1993

OTHER PUBLICATIONS

International Search Report of PCT application No. PCT/JP2022/017853 dated Jun. 21, 2022.

* cited by examiner

Primary Examiner — Karen Masih
(74) Attorney, Agent, or Firm — Rimon P.C.

(57) ABSTRACT

A motor control method that can suppress a mover from vibrating when the mover is stopped is provided. A motor control method includes a command step of generating and outputting a second operation command for operating motor, based on the vibration cycle of mover and on the timing when the operation of motor based on the first operation command for operating motor that moves mover ends, and a drive step of generating and outputting a drive signal for operating motor based on the first operation command and the second operation command.

14 Claims, 10 Drawing Sheets

MOTOR CONTROL METHOD, MOTOR CONTROL DEVICE, AND MOTOR CONTROL SYSTEM

TECHNICAL FIELD

The present disclosure relates to a motor control method, a motor control device, a motor control system, and a program.

BACKGROUND ART

Conventionally, a motor control system or the like that controls a motor to move a mover is known. For example, PTL 1 discloses a motor position control method including performing control with a schematic command value pattern, and creating a correction command value pattern if recognizing a final target position when performing this control.

CITATION LIST

Patent Literature

PTL 1: Unexamined Japanese Patent Publication No. H5-297954

SUMMARY OF THE INVENTION

However, the position control method of PTL 1 is difficult to appropriately superimpose the correction command value pattern, and has a problem that the mover vibrates when the mover is stopped.

The present disclosure has been made to solve such a problem, and an object is to provide a motor control method, a motor control device, a motor control system, and a program that can suppress a mover from vibrating when the mover is stopped.

A motor control method according to one aspect of the present disclosure includes: a command step of generating and outputting a second operation command for operating a motor that moves a mover, based on a vibration cycle of the mover and on at least one of timing when an operation of the motor based on a first operation command for operating the motor ends and a moving distance of the mover based on the first operation command; and a drive step of generating and outputting a drive signal for operating the motor based on the first operation command and the second operation command.

A motor control device according to one aspect of the present disclosure includes: a command part that generates and outputs a second operation command for operating a motor that moves a mover, based on a vibration cycle of the mover and on at least one of an end time of an operation of the motor based on a first operation command for operating the motor and a moving distance of the mover based on the first operation command; and a driver that generates and outputs a drive signal for operating the motor based on the first operation command and the second operation command.

A motor control system according to one aspect of the present disclosure includes the motor control device described above and the motor.

A program according to one aspect of the present disclosure is a program for causing a computer to execute the motor control method described above.

According to the present disclosure, it is possible to provide a motor control method, a motor control device, a motor control system, and a program that can suppress a mover from vibrating when the mover is stopped.

DESCRIPTION OF EMBODIMENT

Exemplary embodiments of the present disclosure will be described below. Note that the exemplary embodiments described below each illustrate one specific example of the present disclosure. Therefore, numerical values, constituent elements, arrangement positions, and connection modes of the constituent elements, and processes, order of the processes, and the like illustrated or shown in the following exemplary embodiments are merely examples, and are not intended to limit the present disclosure. Among the constituent elements in the following exemplary embodiments, constituent elements that are not described in independent claims indicating the highest concept of the present disclosure will be described as optional constituent elements.

Each of the drawings is a schematic view, and is not necessarily precisely illustrated. Note that, in all the drawings, substantially the same configurations are denoted by the same reference marks, and redundant description will be omitted or simplified.

Exemplary Embodiment

Figure 1:
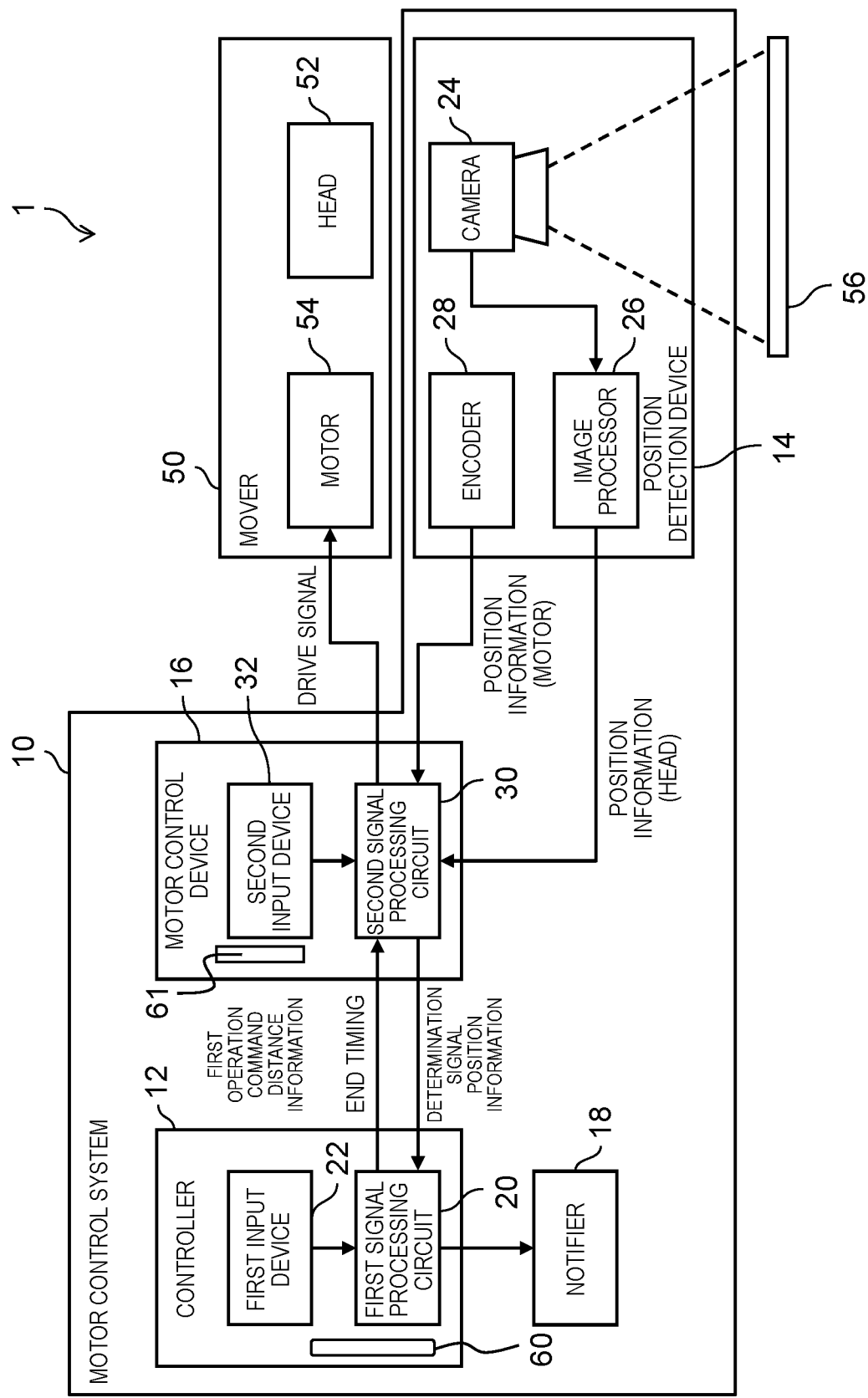
FIG. 1 is a block diagram illustrating a functional configuration of a production device according to an exemplary embodiment.
Figure 2:
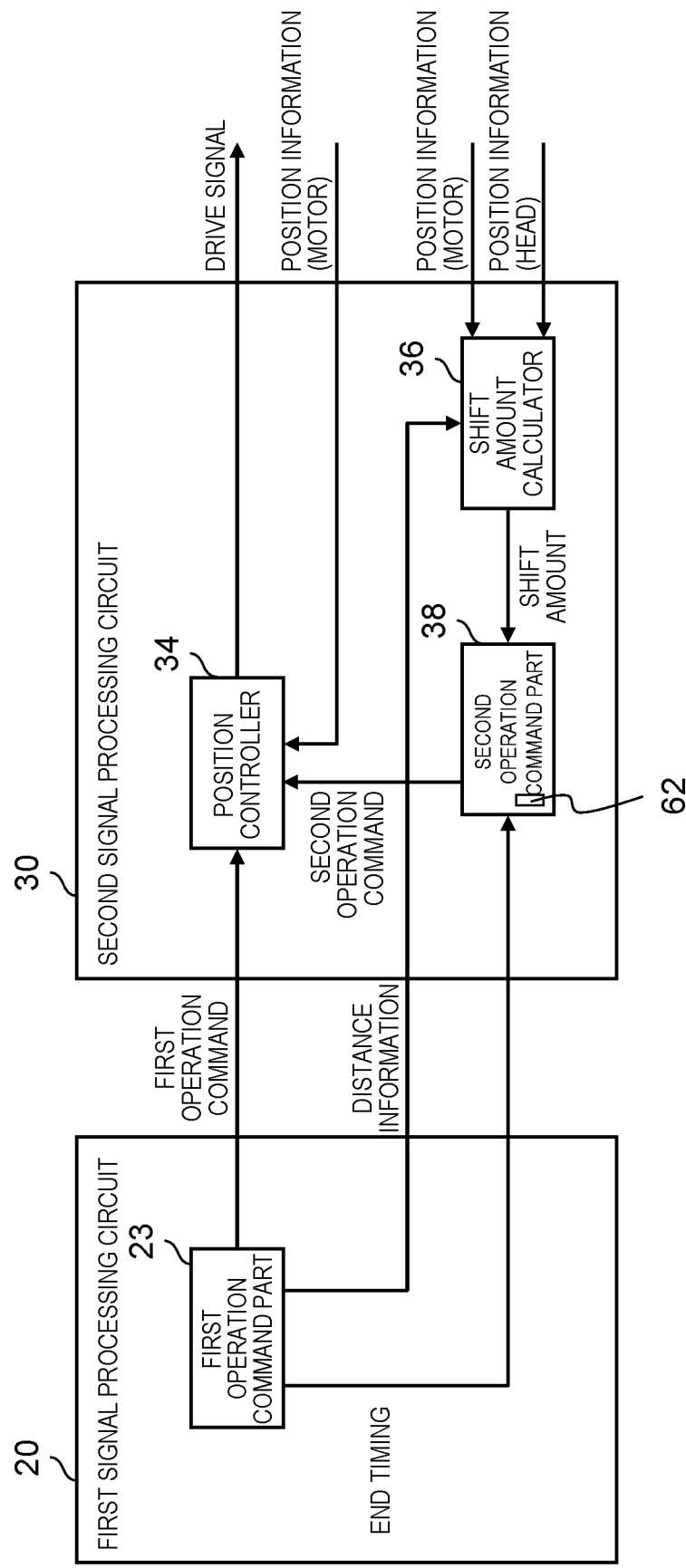
FIG. 2 is a block diagram illustrating functional configurations of a first signal processing circuit and a second signal processing circuit of the production device of FIG. 1.
Figure 3:
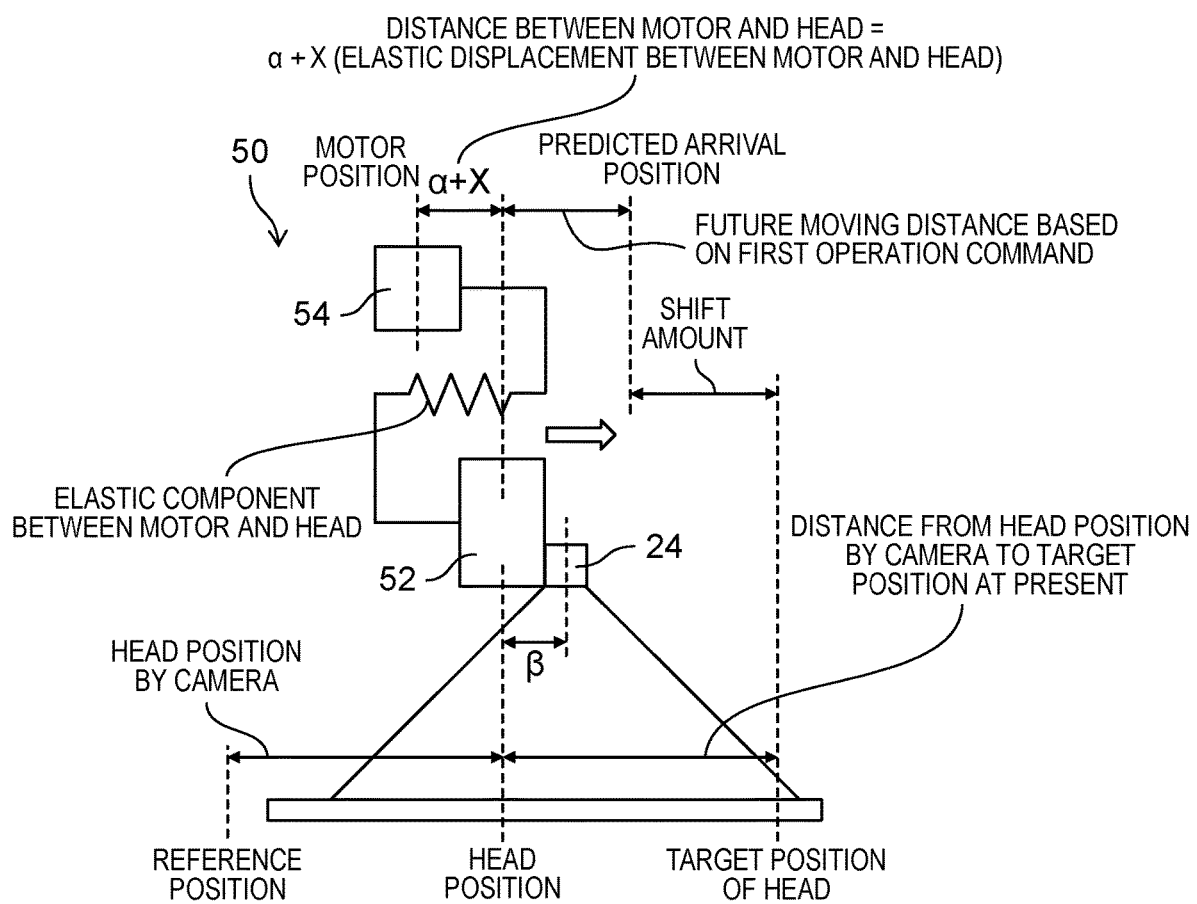
FIG. 3 is a view illustrating a schematic configuration of a mover of the production device of FIG. 1.

FIG. 1 is a block diagram illustrating a functional configuration of production device 1 according to an exemplary embodiment. FIG. 2 is a block diagram illustrating functional configurations of first signal processing circuit 20 and second signal processing circuit 30 of production device 1 of FIG. 1. FIG. 3 is a view illustrating a schematic configuration of mover 50 of production device 1 of FIG. 1.

As illustrated in FIG. 1, production device 1 includes motor control system 10 and mover 50. Mover 50 includes head 52 that holds a target object and motor 54 coupled to head 52 and moving together with head 52. Motor 54 is a drive source for moving head 52. Production device 1 performs production using motor 54. For example, production device 1 is a mounter that moves an electronic component sucked and held by head 52 onto printed wiring substrate 56 together with head 52 using motor 54, and mounts the electronic component at a predetermined position on printed wiring substrate 56.

Motor control system 10 is a system that controls motor 54. For example, motor control system 10 controls the position and the like of motor 54. Motor control system 10 includes controller 12, position detection device 14, motor control device 16, and notifier 18.

Controller 12 is a device that outputs an operation command for moving mover 50. Controller 12 includes first signal processing circuit 20 and first input device 22.

First signal processing circuit 20 is a circuit that performs signal processing. As illustrated in FIG. 2, first signal processing circuit 20 includes first operation command part 23. First operation command part 23 generates a first operation command and outputs the generated first operation command. For example, the first operation command is a position command indicating a moving distance (moving amount) or the like for moving mover 50. For example, the first operation command is a speed command indicating a moving speed or the like for moving mover 50.

In first signal processing circuit 20, an operation command plan for a movement plan until mover 50 arrives a target position from an initial position is set.

For example, the movement plan is set in first signal processing circuit 20 by being input by an operator of controller 12 using first input device 22. For example, the operation command plan is a plan that defines the content of the first operation command, the timing of outputting the first operation command, and the like in order to move mover 50 along the movement plan. For example, first operation command part 23 generates an operation command plan based on a set movement plan, and stores the operation command plan into memory 60 in controller 12. For example, first operation command part 23 moves mover 50 along the movement plan by repeatedly outputting one or more first operation commands based on the operation command plan.

First operation command part 23 calculates a future moving distance of mover 50 based on the first operation command, and outputs distance information indicating the calculated future moving distance. For example, the future moving distance based on the first operation command is a moving distance of mover 50 based on the first operation command output from first operation command part 23 in the future. For example, the first operation command to be output from first operation command part 23 in the future is a first operation command that has not yet been output from first operation command part 23 among all the first operation commands included in the operation command plan. For example, by subtracting the moving distance of mover 50 based on the first operation command already output from first operation command part 23 from the moving distance of mover 50 based on all the first operation commands included in the operation command plan, it is possible to calculate the moving distance of mover 50 based on the first operation command to be output from first operation command part 23 in the future. For example, second signal processing circuit 30 included in motor control device 16 may calculate the future moving distance of mover 50 based on the first operation command.

First signal processing circuit 20 receives a determination signal, position information, and the like from motor control device 16. The determination signal is a signal indicating a determination result on a shift amount between a predicted arrival position of mover 50 and a target position of mover 50. First signal processing circuit 20 controls notifier 18 based on the determination signal. For example, in a case where the shift amount between the predicted arrival position of mover 50 and the target position of mover 50 is more than or equal to a predetermined threshold, first signal processing circuit 20 generates and outputs a notification signal, and causes notifier 18 to notify that effect.

For example, first signal processing circuit 20 is a computer, and the processing of first signal processing circuit 20 can be implemented by program processing in the computer.

First input device 22 is a device that receives an input operation by the operator or the like. For example, as described above, first input device 22 receives the input operation of the movement plan. For example, first input device 22 can be implemented by a touchscreen, a hardware button, or the like.

Position detection device 14 is a device for detecting the position of moving mover 50. Position detection device 14 includes camera 24, image processor 26, and encoder 28.

Camera 24 and image processor 26 are devices for detecting the position of head 52 in mover 50. Camera 24 is coupled to head 52 and moves together with head 52. Image processor 26 processes an image captured by camera 24 and calculates the position of head 52. For example, in a case where the target position appears in an image captured by camera 24, image processor 26 calculates the distance from head 52 to the target position by analyzing the image. Image processor 26 outputs position information indicating the position of head 52.

Encoder 28 is a device for detecting the position of motor 54 in mover 50.

Encoder 28 is coupled to motor 54 and moves together with motor 54. For example, encoder 28 detects the position of motor 54 by reading linear scale 29. Encoder 28 outputs position information indicating the position of motor 54.

For example, image processor 26 may be included in second signal processing circuit 30.

Motor control device 16 is a device that calculates the predicted arrival position of mover 50 based on position information indicating the position of mover 50 detected using position detection device 14 and distance information indicating the future moving distance of mover 50 based on the first operation command, and calculates and outputs the shift amount between the predicted arrival position of mover 50 and the target position of mover 50. Motor control device 16 includes second signal processing circuit 30 and second input device 32.

Second signal processing circuit 30 is a circuit that performs signal processing. As illustrated in FIG. 2, second signal processing circuit 30 includes position controller 34, shift amount calculator 36, and second operation command part 38.

Position controller 34 is an example of a driver that generates and outputs a drive signal for operating motor 54 based on the first operation command and the second operation command. Position controller 34 generates a drive signal for driving motor 54 based on the first operation command output from controller 12, the second operation command output from second operation command part 38, and the position information indicating the position of motor 54 detected using encoder 28, and outputs the generated drive signal.

Based on the position of mover 50 detected using position detection device 14, shift amount calculator 36 calculates the predicted arrival position of mover 50 based on the first operation command, and calculates and outputs the shift amount between the predicted arrival position of mover 50 based on the first operation command and the target position of mover 50.

Shift amount calculator 36 calculates the predicted arrival position of mover 50 based on the position information indicating the position of mover 50 detected using position detection device 14 and the distance information indicating the future moving distance of mover 50 based on the first operation command. The predicted arrival position of mover 50 is a position where mover 50 is predicted to arrive.

The position information of mover 50 detected using position detection device 14 includes position information indicating the position of head 52 detected using camera 24 and position information indicating the position of motor 54 detected using encoder 28. For example, the position of head 52 is calculated by the position of camera 24 with respect to the target position and the distance (see p in FIG. 3) between the position of camera 24 and the position of head 52.

For example, shift amount calculator 36 calculates the predicted arrival position of mover 50 based on the position information indicating the position of motor 54 detected using encoder 28 and the distance information indicating the future moving distance of mover 50 based on the first operation command. Specifically, for example, as illustrated in FIG. 3, shift amount calculator 36 calculates the predicted arrival position of mover 50 by using the position of motor 54 detected using encoder 28, the distance (see α+X in FIG. 3) between the position of motor 54 and the position of head 52, and the future moving distance of mover 50 based on the first operation command.

Shift amount calculator 36 calculates the shift amount between the calculated predicted arrival position of mover 50 and the target position of mover 50, and outputs information indicating the shift amount. Shift amount calculator 36 determines whether or not the calculated shift amount is more than or equal to the predetermined threshold, and outputs a determination signal indicating the determination result. For example, the determination signal output from shift amount calculator 36 is input to second operation command part 38, but may be input to position controller 34 or first signal processing circuit 20.

Second operation command part 38 is an example of a command part that generates and outputs a second operation command for operating motor 54 based on at least one of the timing when the operation of motor 54 based on the first operation command for operating motor 54 that moves mover 50 ends and the moving distance of mover 50 based on the first operation command, and the vibration cycle of mover 50.

For example, the vibration cycle of mover 50 is measured in advance and stored in memory 61 of motor control device 16. For example, the vibration cycle of mover 50 is any of the reciprocal of the resonance frequency of mover 50, the reciprocal of the antiresonance frequency of mover 50, the cycle of vibration generated in mover 50 when the operation of motor 54 based on the first operation command is stabilized, and the reciprocal of the peak frequency of a closed loop frequency response of a position control system.

For example, second signal processing circuit 30 is a computer, and the processing of position controller 34, shift amount calculator 36, and second operation command part 38 can be implemented by program processing in the computer.

Notifier 18 is connected to controller 12. For example, notifier 18 is a display device. In this case, based on the notification signal output from controller 12, notifier 18 displays a warning indicating that the shift amount between the predicted arrival position of mover 50 and the target position of mover 50 is more than or equal to the predetermined threshold.

Note that, for example, notifier 18 may be a warning light. In this case, notifier 18 turns on the warning light based on the notification signal output from controller 12. For example, notifier 18 needs not be connected to controller 12, but may be connected to motor control device 16. For example, notifier 18 may be included in controller 12 or motor control device 16.

Notifier 18 enables the object person (including, for example, a worker who uses production device 1 or a manager and a maintenance person of production device 1) involved in production device 1 (motor control system 10) to easily and quickly grasp that the positional deviation between the predicted arrival position of mover 50 and the target position of mover 50 is more than or equal to the predetermined threshold.

Figure 4:
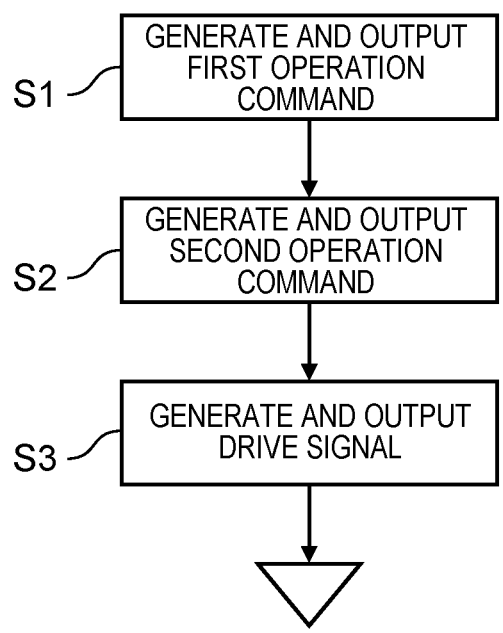
FIG. 4 is a flowchart showing an example of an operation of a motor control system of the production device of FIG. 1.
Figure 5:
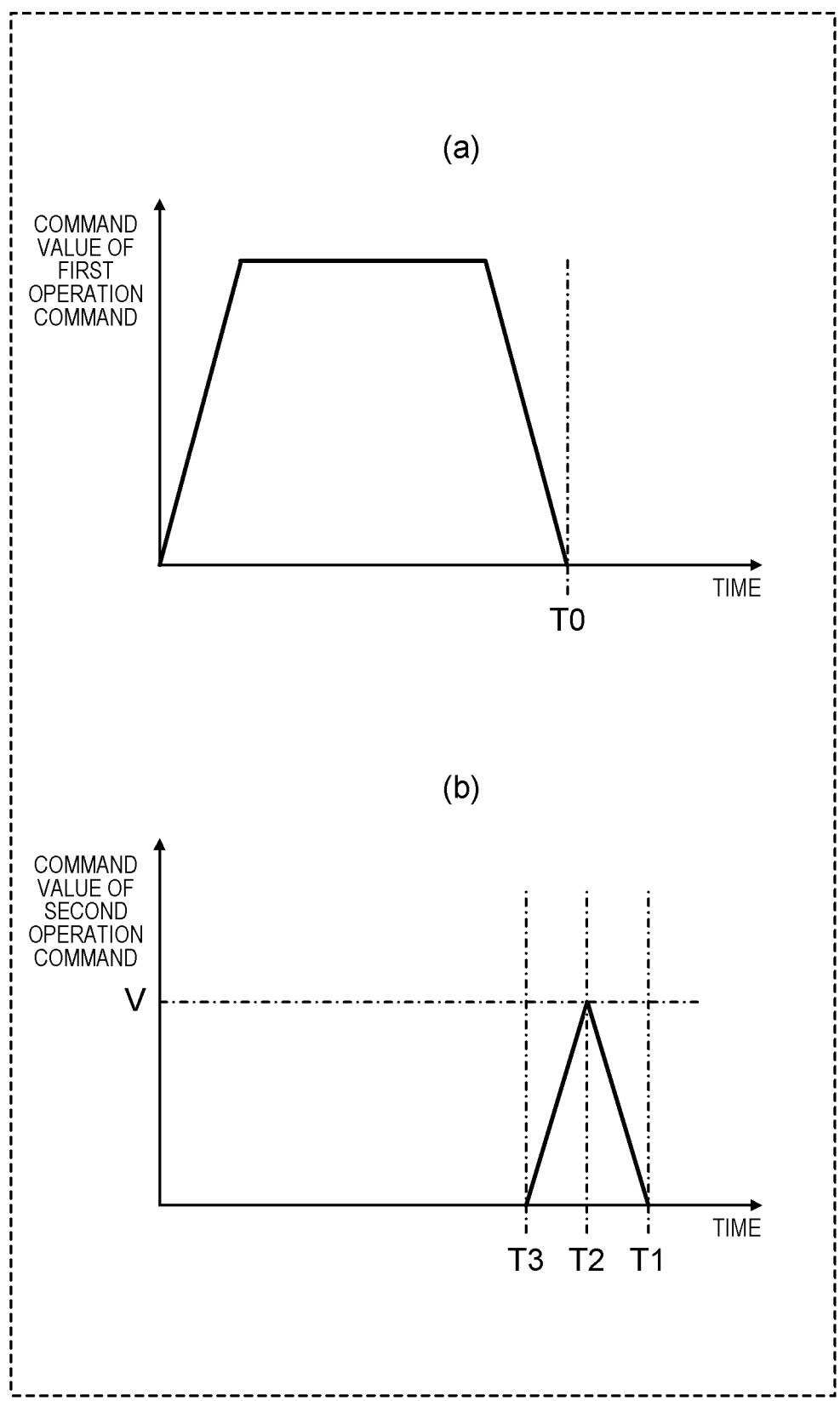
FIG. 5 is a graph showing an example of a first operation command and a second operation command.

FIG. 4 is a flowchart showing an example of the operation of motor control system 10 of production device 1 of FIG. 1. FIG. 5 is a graph showing an example of the first operation command and the second operation command.

As illustrated in FIG. 4, first operation command part 23 of motor control system 10 generates and outputs a first operation command (step S1). For example, as illustrated in (a) of FIG. 5, the first operation command includes a command value at each time. For example, the command value is a speed command value.

Second operation command part 38 of motor control system 10 generates and outputs a second operation command (step S2) (command step). Although details will be described later, for example, second operation command part 38 generates and outputs the second operation command based on the timing when the operation of motor 54 based on the first operation command ends and the vibration cycle of mover 50. For example, as illustrated in (b) of FIG. 5, the second operation command includes a command value at each time. For example, the command value is a speed command value.

Position controller 34 of motor control system 10 generates and outputs a drive signal for driving motor 54 based on the first operation command output from first operation command part 23 and the second operation command output from second operation command part 38 (step S3) (drive step). For example, position controller 34 generates a drive signal for driving motor 54 along a waveform where the first operation command and the second operation command are added. That is, in this case, motor 54 operates at a speed in which the first operation command value and the second operation command value are added.

Figure 6:
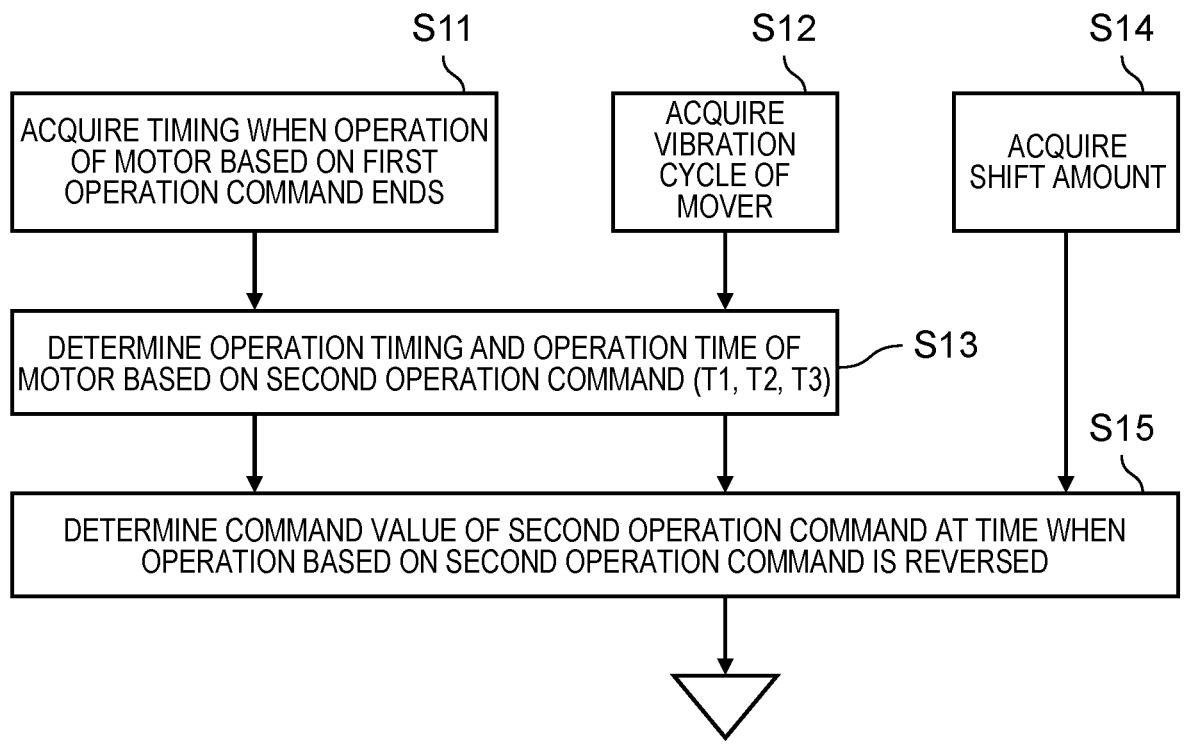
FIG. 6 is a flowchart showing an example of operation of a second operation command part of the production device of FIG. 1.

FIG. 6 is a flowchart showing an example of the operation of second operation command part 38 of production device 1 of FIG. 1.

As illustrated in FIG. 6, second operation command part 38 acquires the timing when the operation of motor 54 based on the first operation command ends (step S11). For example, second operation command part 38 acquires information indicating the timing from first operation command part 23.

Second operation command part 38 acquires the vibration cycle of mover 50 (step S12). As described above, for example, the vibration cycle of mover 50 is measured in advance and stored in memory 62.

Based on the timing when the operation of motor 54 based on the first operation command ends and the vibration cycle of mover 50, second operation command part 38 determines the operation timing and the operation time of motor 54 based on the second operation command (step S13).

For example, based on the timing when the operation of motor 54 based on the first operation command ends, second operation command part 38 determines the timing when the operation of motor 54 based on the second operation command ends.

As illustrated in FIG. 5, specifically, for example, when the vibration cycle of mover 50 is Tf, the time when the operation of motor 54 based on the first operation command ends is T0, and the time when the operation of motor 54 based on the second operation command ends is T1, second operation command part 38 determines timing T1 when the operation of motor 54 based on the second operation command ends so as to satisfy T1−T0=Tf/2+a×Tf (a is an integer). That is, second operation command part 38 determines T1 so as to satisfy the above expression. For example, when the operation direction of motor 54 based on the first operation command is the same as the operation direction of motor 54 based on the second operation command, second operation command part 38 determines, by using the above expression, the timing when the operation of motor 54 based on the second operation command ends.

Specifically, for example, when the vibration cycle of mover 50 is Tf, the time when the operation of motor 54 based on the first operation command ends is T0, and the time when the operation of motor 54 based on the second operation command ends is T1, second operation command part 38 determines the timing when the operation of motor 54 based on the second operation command ends so as to satisfy T1−T0=b×Tf (b is an integer). That is, second operation command part 38 determines T1 so as to satisfy the above expression. For example, when the operation direction of motor 54 based on the first operation command is different from the operation direction of motor 54 based on the second operation command, second operation command part 38 determines, by using the above expression, the timing when the operation of motor 54 based on the second operation command ends.

More specifically, for example, when the time when the operation of motor 54 based on the first operation command ends is T0 and the time when the operation of motor 54 based on the second operation command ends is T1, second operation command part 38 determines the timing when the operation of motor 54 based on the second operation command ends so as to satisfy T1=T0. That is, second operation command part 38 sets the time when the operation of motor 54 based on the second operation command ends to the same time as the time when the operation of motor 54 based on the first operation command ends.

For example, based on the vibration cycle of mover 50, second operation command part 38 determines the operation time of motor 54 based on the second operation command.

As illustrated in FIG. 5, specifically, for example, when the vibration cycle of mover 50 is Tf, the time when the operation of motor 54 based on the second operation command ends is T1, and the time when the operation of motor 54 based on the second operation command is reversed is T2, second operation command part 38 determines the operation time of motor 54 based on the second operation command so as to satisfy T1−T2=c×Tf (c is an integer). For example, the time when the operation of motor 54 based on the second operation command is reversed is the time when motor 54 is switched from the state of operating in the direction of accelerating mover 50 to the state of operating in the direction of decelerating mover 50. That is, for example, the time when the operation of motor 54 based on the second operation command is reversed is the time when the positive and negative of the acceleration of motor 54 based on the second operation command are reversed.

Specifically, for example, when the vibration cycle of mover 50 is Tf, the time when the operation of motor 54 based on the second operation command is reversed is T2, and the time when the operation of motor 54 based on the second operation command starts is T3, second operation command part 38 determines the operation time of motor 54 based on the second operation command so as to satisfy T2−T3=d×Tf (d is an integer).

Second operation command part 38 acquires the shift amount between the predicted arrival position of mover 50 based on the first operation command and the target position of mover 50 (step S14), and, based on the shift amount, determines the command value of the second operation command at the time when the operation of motor 54 based on the second operation command is reversed (step S15).

For example, when the shift amount is X and the command value (speed) is V (see (b) of FIG. 5), second operation command part 38 determines the command value of the second operation command at the time when the operation of motor 54 based on the second operation command is reversed so as to satisfy (T1−T3)×V×1/2=X. That is, second operation command part 38 determines V so as to satisfy the above expression.

Figure 7:
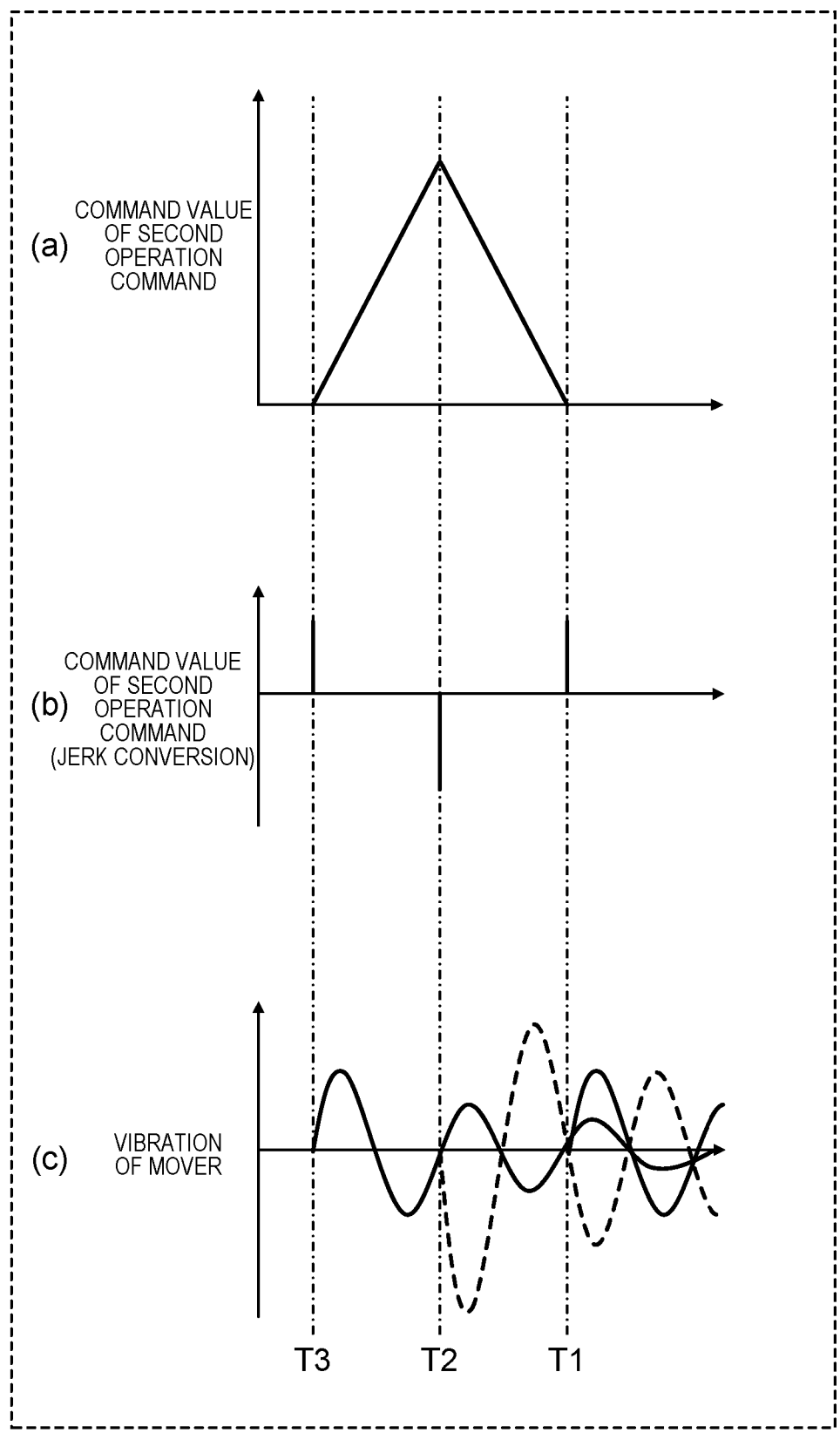
FIG. 7 is a view illustrating vibration applied to the mover when a motor is operated based on the second operation command.

FIG. 7 is a view illustrating vibration applied to mover 50 when motor 54 is operated based on the second operation command.

When the second operation command as illustrated in (a) of FIG. 7 is converted into jerk, a waveform as illustrated in (b) of FIG. 7 is obtained.

By operating motor 54 based on the second operation command generated by the above-described method, it is possible to add, to mover 50, vibration (see the broken line in (c) of FIG. 7) that cancels vibration of mover 50 generated when the operation of motor 54 based on the first operation command ends and mover 50 is stopped, and it is possible to suppress vibration of mover 50 generated when mover 50 is stopped.

Figure 8:
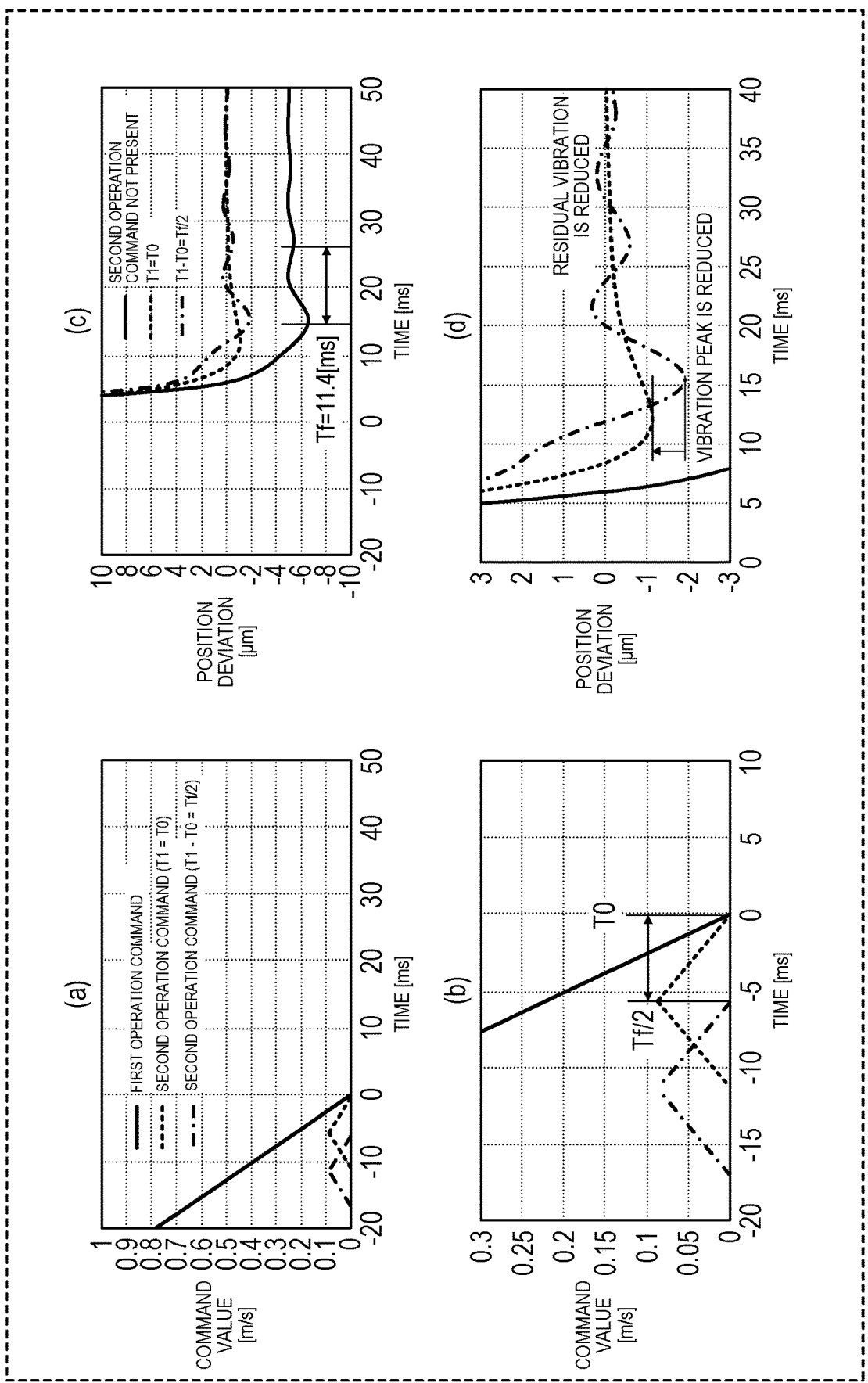
FIG. 8 is a view illustrating a measurement result of the vibration applied to the mover when the motor is operated based on the second operation command.

FIG. 8 is a view illustrating a measurement result of the vibration applied to mover 50 when motor 54 is operated based on the second operation command. (b) of FIG. 8 is an enlarged view of (a) of FIG. 8. (d) of FIG. 8 is an enlarged view of (c) of FIG. 8.

As illustrated in (a) and (b) of FIG. 8, here, measurement was performed in the case of T1=T0 (see the broken line in FIG. 8) and the case of T1−T0=Tf/2 (see the one-dot chain line in FIG. 8). It was set Tf=11.4 [ms].

As illustrated in (c) and (d) of FIG. 8, in both the case of T1=T0 and the case of T1−T0=Tf/2, the vibration of mover 50 was suppressed and the position deviation of mover 50 was reduced as compared with the case where motor 54 is not operated based on the second operation command (see the solid lines in (c) and (d) of FIG. 8).

In the case of T1=T0, the vibration of mover 50 was suppressed and the position deviation of mover 50 was reduced more than those in the case of T1−T0=Tf/2.

Thus, by operating motor 54 based on the second operation command in addition to the first operation command, it was possible to suppress the vibration of mover 50.

The motor control method and the like according to the exemplary embodiment have been described above.

The motor control method according to the exemplary embodiment includes a command step of generating and outputting a second operation command for operating motor 54 based on the timing when the operation of motor 54 based on the first operation command for operating motor 54 that moves mover 50 ends and the vibration cycle of mover 50, and a drive step of generating and outputting a drive signal for operating motor 54 based on the first operation command and the second operation command.

According to this, by generating the second operation command based on the timing when the operation of motor 54 based on the first operation command ends, it becomes easy to generate vibration at the timing of canceling the vibration of mover 50 when mover 50 is stopped. By generating the second operation command based on the vibration cycle of mover 50, it becomes easy to generate vibration of a cycle that cancels the vibration of mover 50 when mover 50 is stopped. Therefore, it is possible to suppress mover 50 from vibrating when mover 50 is stopped.

In the motor control method according to the exemplary embodiment, in the command step, the timing when the operation of motor 54 based on the second operation command ends may be determined based on the timing when the operation of motor 54 based on the first operation command ends.

According to this, it becomes easy to further generate vibration at the timing of canceling the vibration of mover 50 when mover 50 is stopped, and therefore it is possible to further suppress the vibration of mover 50 when mover 50 is stopped.

In the motor control method according to the exemplary embodiment, in the command step, when the vibration cycle of mover 50 is Tf, the time when the operation of motor 54 based on the first operation command ends is T0, and the time when the operation of motor 54 based on the second operation command ends is T1, the timing when the operation of motor 54 based on the second operation command ends may be determined so as to satisfy $T1-T0=Tf/2+a\times Tf$ (a is an integer).

According to this, it becomes easy to further generate vibration at the timing of canceling the vibration of mover 50 when mover 50 is stopped, and therefore it is possible to further suppress the vibration of mover 50 when mover 50 is stopped.

In the motor control method according to the exemplary embodiment, in the command step, when the vibration cycle of mover 50 is Tf, the time when the operation of motor 54 based on the first operation command ends is T0, and the time when the operation of motor 54 based on the second operation command ends is T1, the timing when the operation of motor 54 based on the second operation command ends may be determined so as to satisfy $T1-T0=b\times Tf$ (b is an integer).

According to this, it becomes easy to further generate vibration at the timing of canceling the vibration of mover 50 when mover 50 is stopped, and therefore it is possible to further suppress the vibration of mover 50 when mover 50 is stopped.

In the motor control method according to the exemplary embodiment, in the command step, the timing when the operation of motor 54 based on the second operation command ends may be determined so as to satisfy $T1=T0$.

According to this, it becomes easy to further generate vibration at the timing of canceling the vibration of mover 50 when mover 50 is stopped, and therefore it is possible to further suppress the vibration of mover 50 when mover 50 is stopped.

In the motor control method according to the exemplary embodiment, in the command step, the operation time of motor 54 based on the second operation command may be determined based on the vibration cycle of mover 50.

According to this, it becomes easy to further generate vibration of a cycle of canceling the vibration of mover 50 when mover 50 is stopped, and therefore it is possible to further suppress the vibration of mover 50 when mover 50 is stopped.

In the motor control method according to the exemplary embodiment, in the command step, when the vibration cycle of mover 50 is Tf, the time when the operation of motor 54 based on the second operation command ends is T1, and the time when the operation of motor 54 based on the second operation command is reversed is T2, the operation time of motor 54 based on the second operation command may be determined so as to satisfy $T1-T2=c\times Tf$ (c is an integer).

According to this, it becomes easy to further generate vibration of a cycle of canceling the vibration of mover 50 when mover 50 is stopped, and therefore it is possible to further suppress the vibration of mover 50 when mover 50 is stopped.

In the motor control method according to the exemplary embodiment, in the command step, when the vibration cycle of mover 50 is Tf, the time when the operation of motor 54 based on the second operation command is reversed is T2, and the time when the operation of motor 54 based on the second operation command starts is T3, the operation time of motor 54 based on the second operation command may be determined so as to satisfy $T2-T3=d\times Tf$ (d is an integer).

According to this, it becomes easy to further generate vibration of a cycle of canceling the vibration of mover 50 when mover 50 is stopped, and therefore it is possible to further suppress the vibration of mover 50 when mover 50 is stopped.

In the motor control method according to the exemplary embodiment, in the command step, the command value of the second operation command at the time when the operation of motor 54 based on the second operation command is reversed may be determined based on the shift amount between the predicted arrival position of mover 50 based on the first operation command and the target position of mover 50.

This makes it easy to move mover 50 so as to reduce the shift amount between the predicted arrival position and the target position of mover 50, and therefore it is possible to suppress mover 50 from being stopped at a position shifted from the target position.

In the motor control method according to the exemplary embodiment, the vibration cycle of mover 50 is any of the reciprocal of the resonance frequency of mover 50, the reciprocal of the antiresonance frequency of mover 50, the cycle of vibration generated in mover 50 when the operation of motor 54 based on the first operation command is stabilized, and the reciprocal of the peak frequency of a closed loop frequency response of a position control system.

According to this, it becomes easy to further generate vibration of a cycle of canceling the vibration of mover 50 when mover 50 is stopped, and therefore it is possible to further suppress the vibration of mover 50 when mover 50 is stopped.

Figure 9:
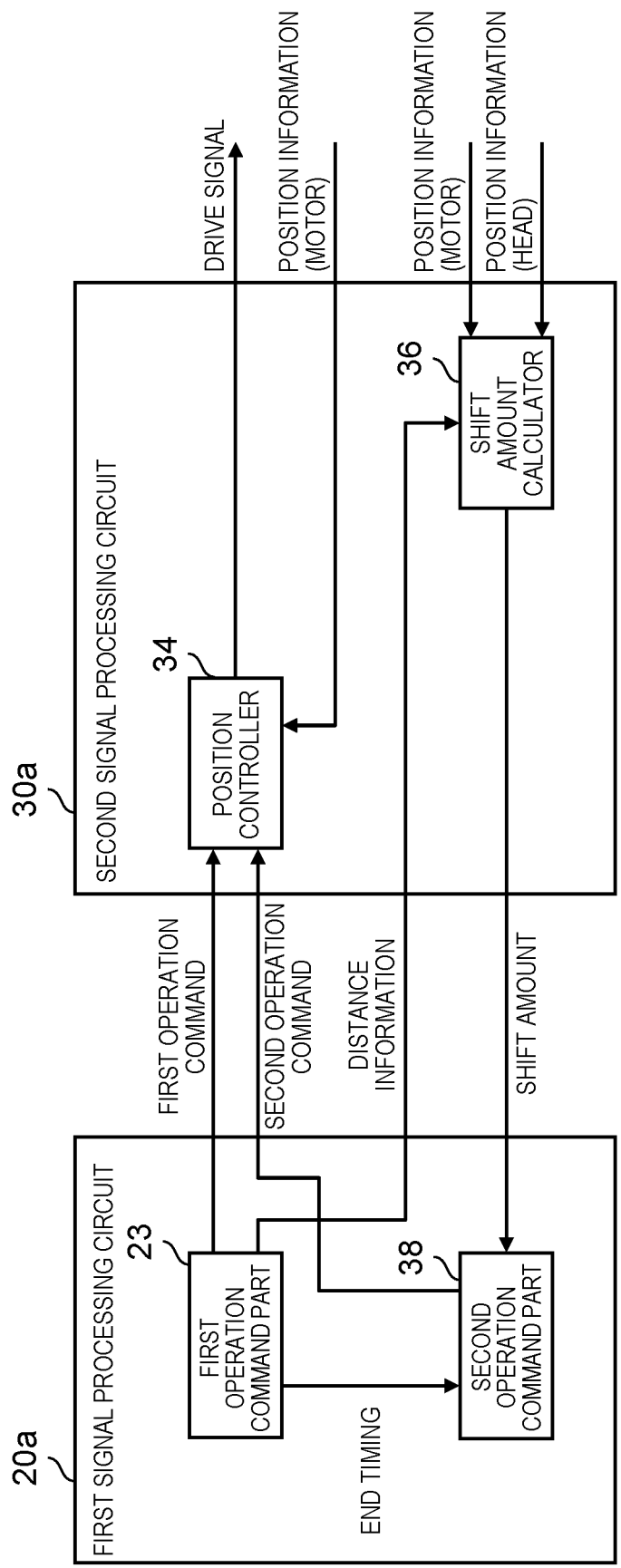
FIG. 9 is a block diagram illustrating functional configurations of a first signal processing circuit and a second signal processing circuit of a production device according to another exemplary embodiment.

FIG. 9 is a view illustrating functional configurations of first signal processing circuit 20a and second signal processing circuit 30a of a production device according to another exemplary embodiment.

As illustrated in FIG. 9, the production device according to the other exemplary embodiment is mainly different from production device 1 in including first signal processing circuit 20a and second signal processing circuit 30a.

In production device 1, second signal processing circuit 30 includes second operation command part 38, but in the production device according to the other exemplary embodiment, first signal processing circuit 20a includes second operation command part 38. This, not second signal processing circuit 30a but first signal processing circuit 20a may include second operation command part 38.

Figure 10:
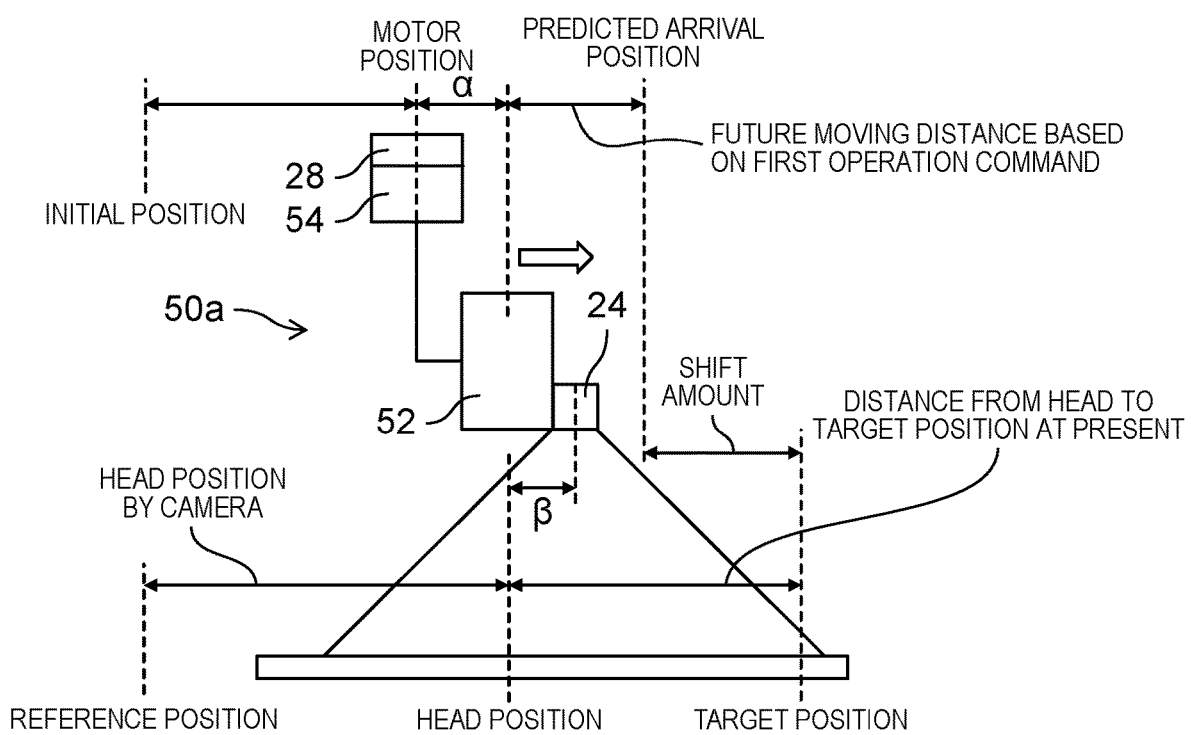
FIG. 10 is a view illustrating a schematic configuration of another mover.

FIG. 10 is a view illustrating a schematic configuration of another mover 50a.

As illustrated in FIG. 10, in mover 50a, head 52 and motor 54 may be coupled by a member having high rigidity so that the distance (see a in FIG. 10) between the position of head 52 and the position of motor 54 does not change.

Other Exemplary Embodiments and the Like

As described above, the exemplary embodiments have been described as examples of the techniques disclosed in the present application. However, the techniques according to the present disclosure is not limited to these, and can also be applied to exemplary embodiments or variations in which changes, replacements, additions, omissions, and the like are made as appropriate without departing from the concept of the present disclosure.

In the above-described exemplary embodiments, a case where second operation command part 38 generates the second operation command based on the timing when the operation of motor 54 based on the first operation command ends and the vibration cycle of mover 50 has been described, but the present invention is not limited to this. For example, the second operation command part may generate the second operation command based on the future moving distance of the mover based on the first operation command and the vibration cycle of the mover. Specifically, for example, based on the future moving distance of the mover based on the first operation command, the second operation command part may determine the timing of starting the operation based on the second operation command. More specifically, for example, in a case where the future moving distance of the mover based on the first operation command is smaller than a predetermined distance, the second operation command part may generate the second operation command so that the operation based on the second operation command starts immediately after the operation based on the first operation command is started.

In the above-described exemplary embodiments, a case where, based on the position of mover 50 detected using position detection device 14, motor control device 16 (shift amount calculator 36 included in motor control device 16) calculates the predicted arrival position of mover 50 based on the first operation command and calculates the shift amount between the predicted arrival position and the target position of mover 50 has been described, but the present invention is not limited to this. For example, the position detection device may receive the first operation command, calculate, based on the position of the mover detected using the position detection device, the predicted arrival position of the mover based on the first operation command, and calculate the shift amount between the predicted arrival position and the target position of the mover.

In the above-described exemplary embodiments, the case where motor 54 moves together with head 52 has been described, but the present invention is not limited to this. For example, the motor needs not move together with the head. In this case, the mover does not include the motor.

In the above-described exemplary embodiments, the case where camera 24 moves together with head 52 has been described, but the present invention is not limited to this. For example, the camera may be fixed at a place where it can capture the target position.

General or specific aspects of the present disclosure may be implemented by a system, a device, a method, an integrated circuit, a computer program, or a computer-readable recording medium such as a CD-ROM. The aspects may be implemented with any combination of the system, the device, the method, the integrated circuit, the computer program, and the recording medium.

For example, the present disclosure may be implemented as the motor control system of the above-described exemplary embodiments. The present disclosure may be implemented as a motor control device. The present disclosure may be implemented as a motor control method. The present disclosure may be implemented as a program for causing a computer to execute the motor control method, or may be implemented as a computer-readable non-transitory recording medium in which such program is recorded.

INDUSTRIAL APPLICABILITY

The motor control method and the like according to the present disclosure can be used for a control method and the like for moving a mover using a motor.

REFERENCE MARKS IN THE DRAWINGS

10: motor control system
12: controller
14: position detection device
16: motor control device
18: notifier
20, 20a: first signal processing circuit
22: first input device
23: first operation command part
24: camera
26: image processor
28: encoder
30, 30a: second signal processing circuit
32: second input device
34: position controller
36: shift amount calculator
38: second operation command part
60, 61, 62: memory

The invention claimed is:

1. A motor control method comprising:
a command step of generating and outputting a second operation command for operating a motor that moves a mover, based on a vibration cycle of the mover and on at least one of (i) timing when an operation of the motor based on a first operation command for operating the motor ends and (ii) a moving distance of the mover based on the first operation command; and a drive step of generating and outputting a drive signal for operating the motor based on the first operation command and the second operation command.

2. The motor control method according to claim 1, wherein in the command step, timing when an operation of the motor based on the second operation command ends is determined based on the timing when an operation of the motor based on the first operation command ends.

3. The motor control method according to claim 2, wherein in the command step, when the vibration cycle of the mover is Tf, a time when an operation of the motor based on the first operation command ends is T1, and a time when an operation of the motor based on the second operation command ends is T1, timing when an operation of the motor based on the second operation command ends is determined so as to satisfy $T1-T0=Tf/2+a \times Tf$, where a is an integer.

4. The motor control method according to claim 2, wherein in the command step, when the vibration cycle of the mover is Tf, a time when an operation of the motor based on the first operation command ends is T0, and a time when an operation of the motor based on the second operation command ends is T1, timing when an operation of the motor based on the second operation command ends is determined so as to satisfy $T1-T0=b \times Tf$, where b is an integer.

5. The motor control method according to claim 4, wherein in the command step, timing when an operation of the motor based on the second operation command ends is determined so as to satisfy $T1=T0$.

6. The motor control method according to claim 1, wherein in the command step, an operation time of the motor based on the second operation command is determined based on the vibration cycle of the mover.

7. The motor control method according to claim 6, wherein in the command step, when the vibration cycle of the mover is Tf, a time when an operation of the motor based on the second operation command ends is T1, and a time when an operation of the motor based on the second operation command is reversed is T2, an operation time of the motor based on the second operation command is determined so as to satisfy $T1-T2=c \times Tf$, where c is an integer.

8. The motor control method according to claim 6, wherein in the command step, when the vibration cycle of the mover is Tf, a time when an operation of the motor based on the second operation command is reversed is T2, and a time when an operation of the motor based on the second operation command starts is T3, an operation time of the motor based on the second operation command is determined so as to satisfy $T2-T3=d \times Tf$, where d is an integer.

9. The motor control method according to claim 1, wherein in the command step, a command value of the second operation command at a time when an operation of the motor based on the second operation command is reversed is determined based on a shift amount between a predicted arrival position of the mover based on the first operation command and a target position of the mover.

10. The motor control method according to claim 1, wherein the vibration cycle of the mover is any of a reciprocal of a resonance frequency of the mover, a reciprocal of an antiresonance frequency of the mover, a cycle of vibration generated in the mover when an operation of the motor based on the first operation command is stabilized, and a reciprocal of a peak frequency of a closed loop frequency response of a position control system.

11. A motor control device comprising:
a command part that generates and outputs a second operation command for operating a motor that moves a mover, based on a vibration cycle of the mover and on at least one of an end time of an operation of the motor based on a first operation command for operating the motor and a moving distance of the mover based on the first operation command; and
a driver that generates and outputs a drive signal for operating the motor based on the first operation command and the second operation command.

12. The motor control device according to claim 11 further comprising:
a position detection device for detecting a position of the mover,
wherein based on a position of the mover detected using the position detection device, the motor control device or the position detection device calculates a predicted arrival position of the mover based on the first operation command, and calculates a shift amount between the predicted arrival position and a target position of the mover.

13. A motor control system comprising:
a motor, and
a motor control device comprising:
a command part that generates and outputs a second operation command for operating the motor that moves a mover, based on a vibration cycle of the mover and on at least one of an end time of an operation of the motor based on a first operation command for operating the motor and a moving distance of the mover based on the first operation command; and
a driver that generates and outputs a drive signal for operating the motor based on the first operation command and the second operation command.

14. The motor control system according to claim 13 further comprising:
a position detection device for detecting a position of the mover,
wherein based on a position of the mover detected using the position detection device, the motor control device or the position detection device calculates a predicted arrival position of the mover based on the first operation command, and calculates a shift amount between the predicted arrival position and a target position of the mover.

* * * * *